M. L. WIENER.
WHEEL.
APPLICATION FILED MAY 21, 1919.
1,335,037. Patented Mar. 30, 1920.
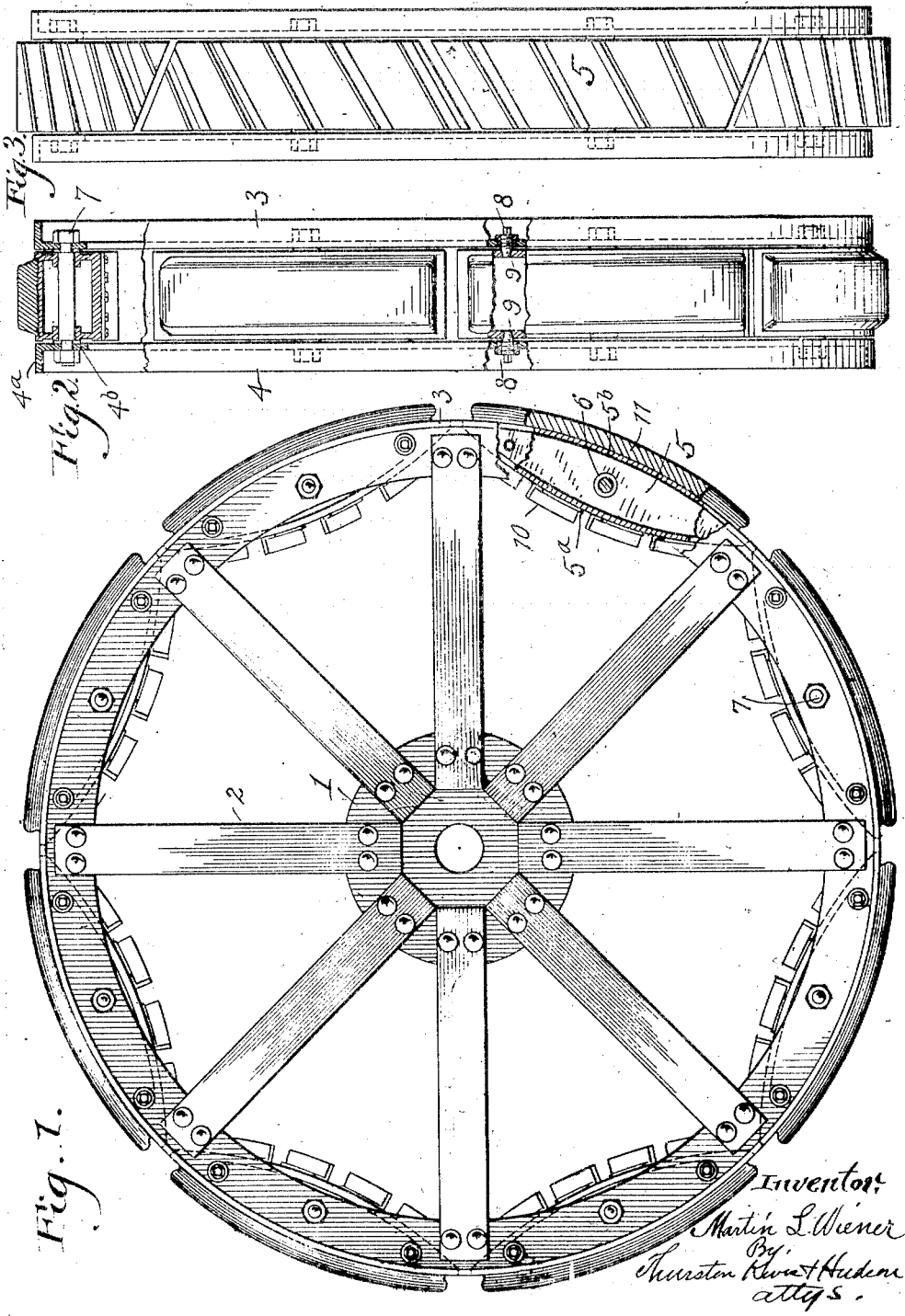

UNITED STATES PATENT OFFICE.

MARTIN L. WIENER, OF AKRON, OHIO.

WHEEL.

1,335,037.         Specification of Letters Patent.         Patented Mar. 30, 1920.

Application filed May 21, 1919. Serial No. 298,656.

*To all whom it may concern:*

Be it known that I, MARTIN L. WIENER, a citizen of the United States, residing at Akron, in the State of Ohio, have invented a certain new and useful Improvement in Wheels, of which the following is a full, clear, and exact description.

The present invention in its broadest aspect, relates to a wheel, which by its construction is capable of being converted from a road wheel to a traction wheel, or vice versa.

The wheel is more particularly intended for use as a wheel for tractors and when used for this purpose the periphery of the wheel presents a surface provided with traction cleats. But it frequently happens that tractors are required to be transported under their own power over roadways, in which event it is desirable that the wheels thereof shall be free from cleats which are apt to damage the road as well as impede progress of the tractor, and therefore the wheel of this invention is so constructed that it may be readily changed so as to present a wheel periphery of even or substantially even contour, which adapts it for road use.

An object of the invention is to provide a wheel in which the conversion of the wheel from a tractor type of wheel to a road type of wheel may be made by reversing certain parts of the wheel so that no extra or detached parts are necessary in effecting the conversion.

Another object of the invention is to provide a wheel having a periphery, which is composed of a plurality of pivoted sections, which sections upon one surface thereof are provided with cleats or similar traction devices, while upon the other side the pivoted sections are provided with a plain road engaging portion which may be made of resilient material where the same is desired.

Generally speaking, the invention may be said to comprise the elements and combinations thereof set forth in the accompanying claims.

Reference should be had to the accompanying drawings forming a part of this specification in which Figure 1 is a side elevation of the wheel having a portion thereof shown in section; Fig. 2 is an end elevation of the wheel with portions in section, showing the wheel with the road engaging portions outermost; Fig. 3 is an end elevation of the wheel showing the wheel with the traction portions thereof outermost.

Referring to the drawing and more particularly Fig. 1 thereof, the hub of the wheel is indicated at 1 and provides a central opening which is adapted to receive the axle of the vehicle. From this hub there are two sets of radiating spokes, one set of which spokes is illustrated in Fig. 1. These spokes are indicated at 2 and the spokes at their inner ends are secured to the hub 1 in any suitable fashion, as by riveting the same. The spokes may conveniently be formed of flat metal strips. The outer ends of the spokes are secured to two oppositely disposed annular members which are indicated at 3 and 4 respectively. These members 3 and 4, as shown, are L-shaped, thereby providing outwardly extending flanges, such as indicated at $4^a$, and inwardly extending webs $4^b$ as indicated in Fig. 2. The spokes 2 are secured to the inwardly extending webs of the members 3 and 4.

Between the members 3 and 4 there are positioned a plurality of sections, such as indicated generally at 5. These sections are hollow and have two oppositely disposed surfaces $5^a$ and $5^b$, each of which surfaces are so formed that when turned in position to form the periphery of the wheel, they conform generally with the circle of curvature of the wheel.

Each of these sections is mounted upon a central pivot 6 which pivot extends between the members 3 and 4, being secured in the inwardly extending webs of these members and the pivotal mounting 6 is at its ends secured and held by any suitable means, such as nuts 7.

It will be seen from the mounting of the members 5, which has just been described, that they are pivotally mounted and each may be turned about its pivot so that the surface $5^a$ or the surface $5^b$ is outermost.

The pivoted sections 5 are held in position in any desired manner and for the purpose, I have shown in Fig. 2 threaded members 8, there being a pair of these threaded members 8 adjacent each end of each section. These members 8 are mounted in suitable threaded openings in the web portions of the members 3 and 4 and are adapted to engage with suitable openings such as indicated at 9 in the pivoted sectional members 5. As shown in Fig. 2, members 8 are provided with conical heads which seat in conical openings in the side walls of the members 5. As before stated, the pivoted members 5 are secured to the members 3 and 4 adjacent each end of each section, so that the members 5 when secured in their adjusted positions are firmly held against movement.

The particular means which has just been described for securing the ends of the members 5 with respect to the members 3 and 4 is merely illustrative of any desired means for effecting the result.

Each of the pivoted members 5 upon the surface 5a thereof carries a plurality of transversely extending cleats 10, these cleats being secured to the surface 5a in any desired manner, and as shown in the drawing, the surface 5b of the pivoted sections 5 is constructed and adapted to receive a cushion member 11.

It is obvious that it is not necessary that resilient or cushion tread be employed and it is within the province f my invention to use a plain nonresilient tread in place of the resilient member 11, where such is desired.

The ends of the pivoted members 5 may be straight, as shown in Fig. 2 or the ends of the pivoted members 5 may be so formed that the engagement between one section and the ground does not cease before the next succeeding section of the wheel comes into engagement with the ground. Various constructions may be employed for the purpose and in Fig. 3 I have shown one construction wherein the ends of the sections are made diagonal. This is desirable under certain circumstances, as when the wheel is in use the engagement between one section and the ground does not cease before the next succeeding section of the wheel passes into engagement with the ground. This provides a more even ground engaging surface.

In Fig. 1 the members 5 are all shown with the plain portions thereof outermost, or in other words, the sections are in position which adapts the wheel for road purposes.

In order to convert the wheel to a traction wheel, it is only necessary to remove the securing members 8, thereby permitting the members 5 to be turned about their pivots and presenting the cleats to form the outside or ground engaging surface of the wheel. The sections are then secured in place and by this simple operation the wheel has been converted from a road type of wheel to a traction type of wheel.

Attention is called to the fact that this wheel, although convertible, is a self contained wheel, and the change from one type of wheel to another, may be made without removing the wheel from the vehicle to which it is attached, and without the necessity of removing and replacing tread sections.

Having described my invention, I claim

1. A wheel, comprising a central hub, radiating spokes and oppositely disposed rim members, a plurality of ground engaging members secured between the said rim members, each of said ground engaging members being provided with oppositely disposed surfaces which are adapted to be positioned to serve as the periphery of the wheel.

2. A wheel, comprising a central hub, radiating spokes and oppositely disposed rim members, a plurality of ground engaging members secured between said rim members, each of said ground engaging members being provided with a plurality of surfaces, the said surfaces carrying ground engaging means of different characters.

3. A wheel, comprising a central hub, radiating spokes and oppositely disposed rim members, a plurality of ground engaging members secured between said rim members, each of said ground engaging members having oppositely disposed portions, cleats carried by one of said portions and a plain rim member carried by the other of said portions.

4. A wheel, comprising a central hub, radiating spokes and oppositely disposed rim members, a plurality of ground engaging members which are pivotally secured between the said rim members, means for securing the said ground engaging members against pivotal movement, each of said ground engaging members having road engaging surfaces of different character.

5. A wheel, comprising a central hub, radiating spokes and oppositely disposed rim members, a plurality of ground engaging members pivotally mounted between said rim members, means for securing the said ground engaging members at their ends to the rim members, each of said ground engaging members having oppositely disposed surfaces, a plain rim member carried by one of said surfaces and cleats carried by the other of said surfaces.

6. A wheel, comprising a central hub, radiating spokes and oppositely disposed rim members, a plurality of ground engaging members mounted between the said rim members and adapted for reversal in position between said rim members, each of said ground engaging members having a plain rim portion and a cleated portion.

In testimony whereof, I hereun o affix my signature.

MARTIN L. WIENER.